(12) United States Patent
Wijaya

(10) Patent No.: US 6,802,880 B1
(45) Date of Patent: Oct. 12, 2004

(54) AIR GUIDED FILTER FOR INTERNAL COMBUSTION ENGINE

(76) Inventor: Heru Prasanta Wijaya, Graha Famili D. 183, PR. Kali Kendal, Surabaya 60226 (ID)

( * ) Notice: Subject to any disclaimer, the term of this patent is extended or adjusted under 35 U.S.C. 154(b) by 22 days.

(21) Appl. No.: 10/048,765

(22) PCT Filed: May 29, 2000

(86) PCT No.: PCT/IB00/00727
§ 371 (c)(1),
(2), (4) Date: Jan. 29, 2002

(87) PCT Pub. No.: WO01/92713
PCT Pub. Date: Dec. 6, 2001

(51) Int. Cl.⁷ .......................... B01D 53/06; B01D 46/26
(52) U.S. Cl. .......................... 55/385.3; 55/392; 55/397; 55/398; 55/399; 96/125; 96/135; 96/140; 96/142; 123/198 E; 123/300; 123/432
(58) Field of Search ................ 55/385.3, 392, 55/397, 398, 399; 96/125, 135, 140, 142; 123/198 E, 300, 432

(56) References Cited

U.S. PATENT DOCUMENTS

| | | | |
|---|---|---|---|
| 2,453,593 A | * 11/1948 | Putney | .................. 55/398 |
| 4,832,709 A | * 5/1989 | Nagyszalanczy | .............. 55/398 |
| 5,914,414 A | * 6/1999 | Taomo et al. | ............... 55/385.3 |
| 5,947,081 A | 9/1999 | Kim | |
| 6,348,086 B1 | * 2/2002 | Harms et al. | ............... 55/385.3 |

FOREIGN PATENT DOCUMENTS

| EP | 0 597 173 | 5/1991 |
|---|---|---|
| FR | 1.398.905 | 4/1965 |
| FR | 1 398 905 | 9/1965 |
| WO | WO 94/05906 | 3/1991 |

* cited by examiner

Primary Examiner—Minh-Chau T. Pham
(74) Attorney, Agent, or Firm—Christie, Parker & Hale, LLP

(57) ABSTRACT

An air guide filter for an internal combustion engine includes an air filter having a pair of support rings coupled to upper and lower portions of the filter. A pleated filter plate is disposed between the support rings, and an air guide is disposed between the support rings parallel with the filter plate. The air guide comprises a plurality holes defined by half-cone cross-section depressions uniformly disposed about its face, such that, when the air guide is placed at a certain elevation angle with respect to the support rings, air flowing into the filter is guided, rotated and mixed with fuel to generate a uniform air-fuel mixture. The uniform mixture improves combustion and engine performance.

14 Claims, 6 Drawing Sheets

UDARA

AIR GUIDED FILTER FOR INTERNAL COMBUSTION ENGINE

CROSS-REFERENCE TO RELATED APPLICATION

This application claims priority of International Patent application number PCT/IB00/00727, filed May 29, 2000.

FIELD OF THE INVENTION

The present invention relates to an air filter used in an internal combustion engine, and particularly, to an air filter provided with an air guide which directs air for uniform passage through the filter.

BACKGROUND

Nowadays, internal combustion engines are designed to have high performance, such as high power resulting from better combustion. Such better combustion produces an optimal power and unharmful combustion residue to the environment.

Internal combustion engines at present are of ample use as driving means in agriculture machinery, industrial devices and electric generators.

Environmental factors and optimality of fuel per unit power consumed by an internal combustion engine, as well as combustion of mixed fuel and air in the combustion chamber of an internal combustion engine can be improved. Improved combustion mixture of air and fuel can be achieved when air to be mixed with fuel has met certain conditions.

One way to improve the combustion is homogeneously mix and disperse the fuel and air mixture quality in an internal combustion chamber prior to combustion.

Thus there is a need for a device wherein the improvement cited above can be economically achieved without having to redesign the construction of the engine.

SUMMARY OF THE INVENTION

Based on the reasons disclosed above, a device is provided which can improve the combustion quality of air and fuel mixture in an internal combustion engine. The device is integrally arranged with an air filter and is called an air guided filter.

The object of the present invention is to improve internal combustion engine performance without changing the basic construction of the engine. The improvement encompasses only the action of changing the existing air filter with an air filter according to the present invention. By using the air filter equipped with an air guide, the air flowing into the combustion chamber stays clean since it is filtered and guided in such a way that the quality of the air and fuel mixed is improved. The combustion in the internal combustion chamber will thus be improved.

BRIEF DESCRIPTION OF THE DRAWINGS

These and other features and advantages of the present invention will be better understood by reference to the following detailed description when considered in conjunction with the accompanying drawings, wherein.

DETAILED DESCRIPTION

Figure 1A:
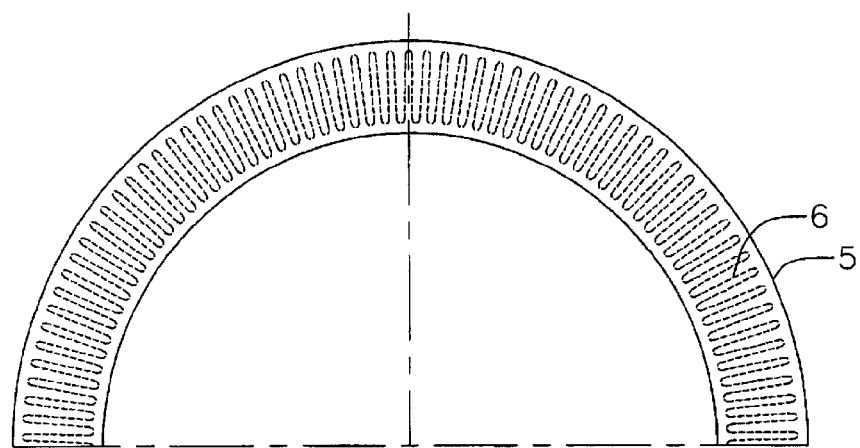
FIG. 1A illustrates a partial top view of an air filter on which an air guide is attached on and outer part of a filter paper and the two ends of the air guide are bound by a supporting ring.
Figures 1B, 1C:
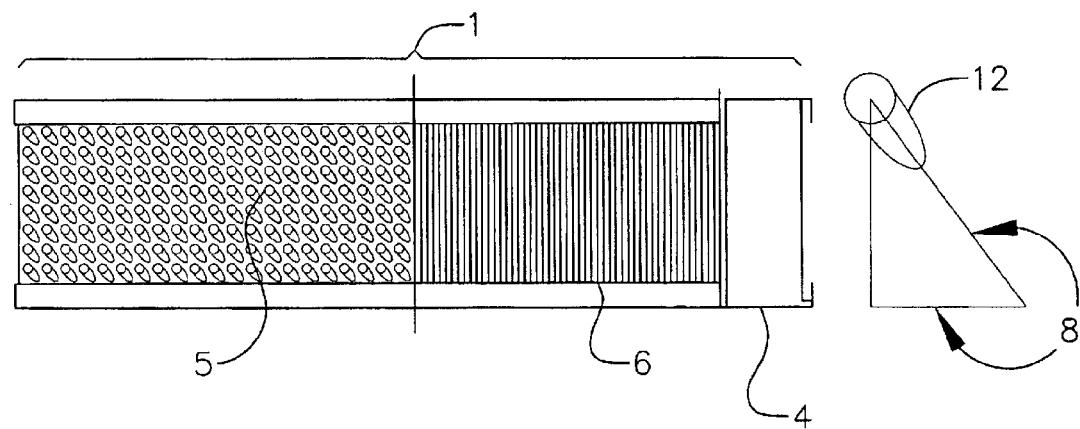
FIG. 1B illustrates a side view of the air filter shown in FIG. 1A, the side view being partially sectioned to show the filter paper.
FIG. 1C is a partial exploded view of a depression of the air guide shown in FIG. 1A.
Figure 2A:
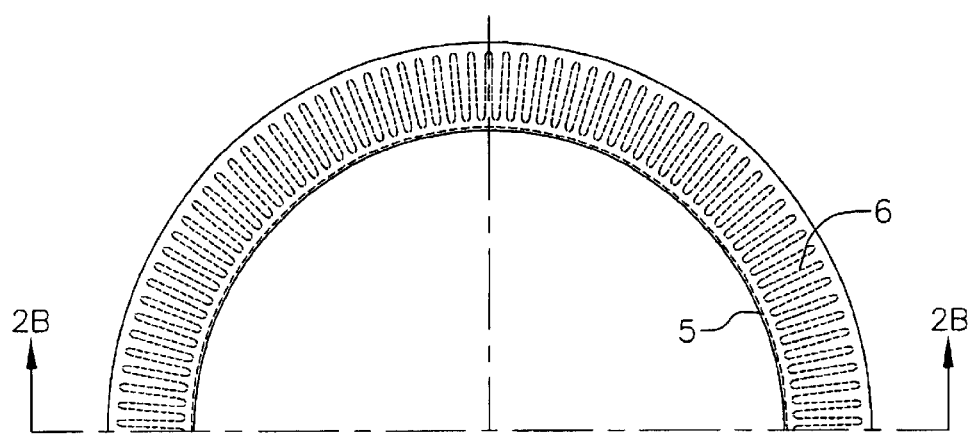
FIG. 2A illustrates a partial top view of an air filter on which an air guide is attached on the inner part of the air filter and the two ends of the air guide are bound by a supporting ring.
Figures 2B, 2C:
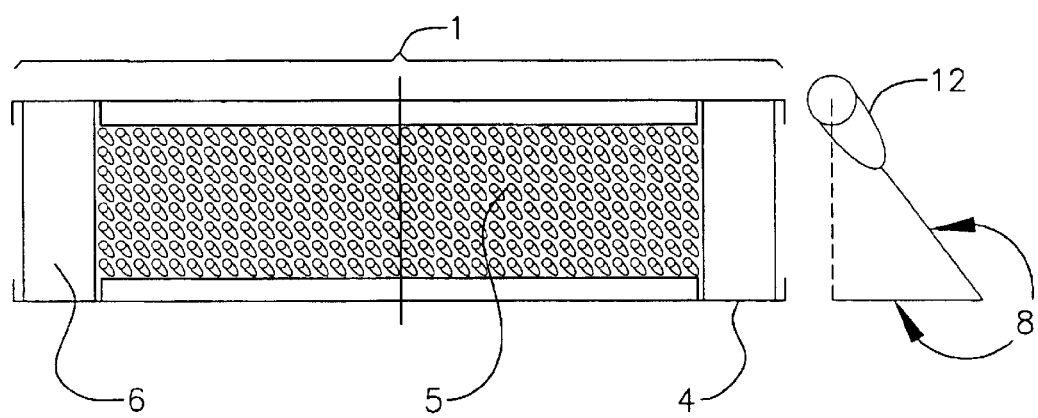
FIG. 2B illustrates a sectional view along Section line 2B—2B of the air filter shown in FIG. 2A.
FIG. 2C is a partial exploded view of a depression of the air guide shown in FIG. 2A.
Figure 6:
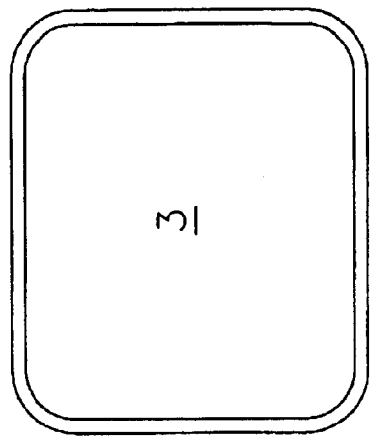
FIG. 6 illustrates diagramatically the position of an air filter in an internal combustion engine according to the present invention.
Figure 6:
Figure 6:
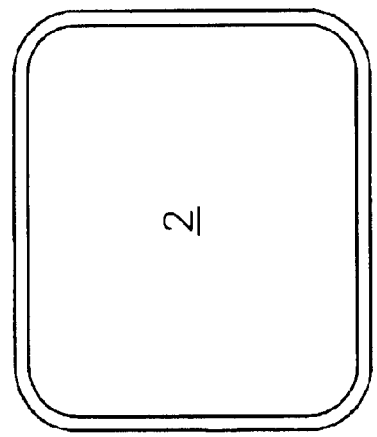
Figure 6:
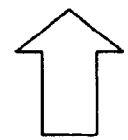
Figure 6:
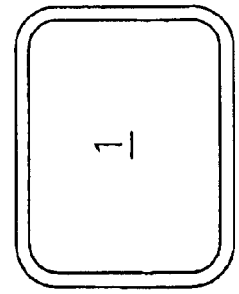

In an internal combustion engine an air filter 1 is placed before a manifold or air channel 2 and a combustion chamber 3 of an engine, as for example shown schematically in FIG. 6. Referring to FIGS. 1A and 1B, an air guide 5 is placed on the outer part of an air filter 1 or, on FIG. 2, on the inner part of air filter 1. The air guide 5 of air filter 1 is placed parallel to the pleated filter paper 6 with upper and lower portions thereof are attached on filter support ring 4. Air guide 5 may be placed in the inner part of the air filter (FIGS. 2A and 2B), or on the outer part of the air filter (FIGS. 1A and 1B) depending upon the required design of the filter.

With air guide 5 being attached to the air filter 1 in accordance with an exemplary embodiment of the present invention, air flowing into an air channel 2 will be directed in the same direction. When air guide 5 is elevated to a certain elevation angle 8, the air flowing into the filter will be guided as well as rotated. The rotated air creates a mixing effect when mixed with fuel such that the mixtures are uniform. The mixtures of air and fuel uniformly mixed when combusted in combustion chamber, will create an improved combustion, for which it will sequently increase internal combustion engine performance.

Figure 3A:
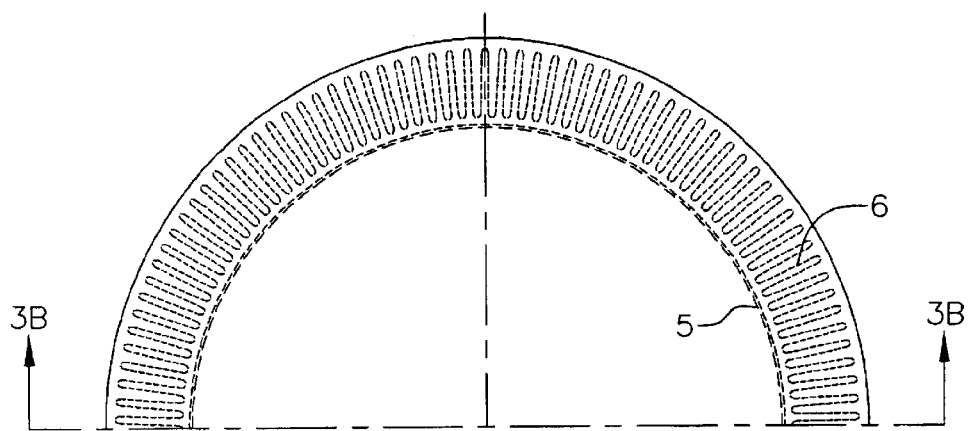
FIG. 3A is a partial top view of an air filter having an air guide fixed to the inner filter paper forming an elevation angle with a supporting ring.
Figure 3B:
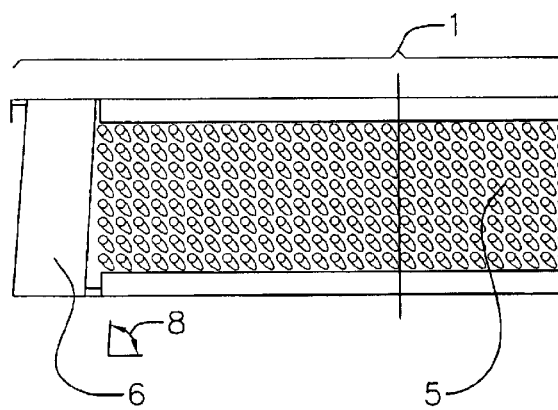
FIG. 3B illustrates a sectional view along Section line 3B—3B of the air filter shown in FIG. 3A.
Figure 3C:
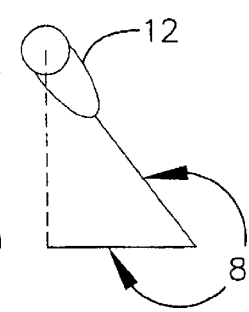
FIG. 3C is a partial exploded view of a depression of the air guide shown in FIG. 3A.
Figure 4A:
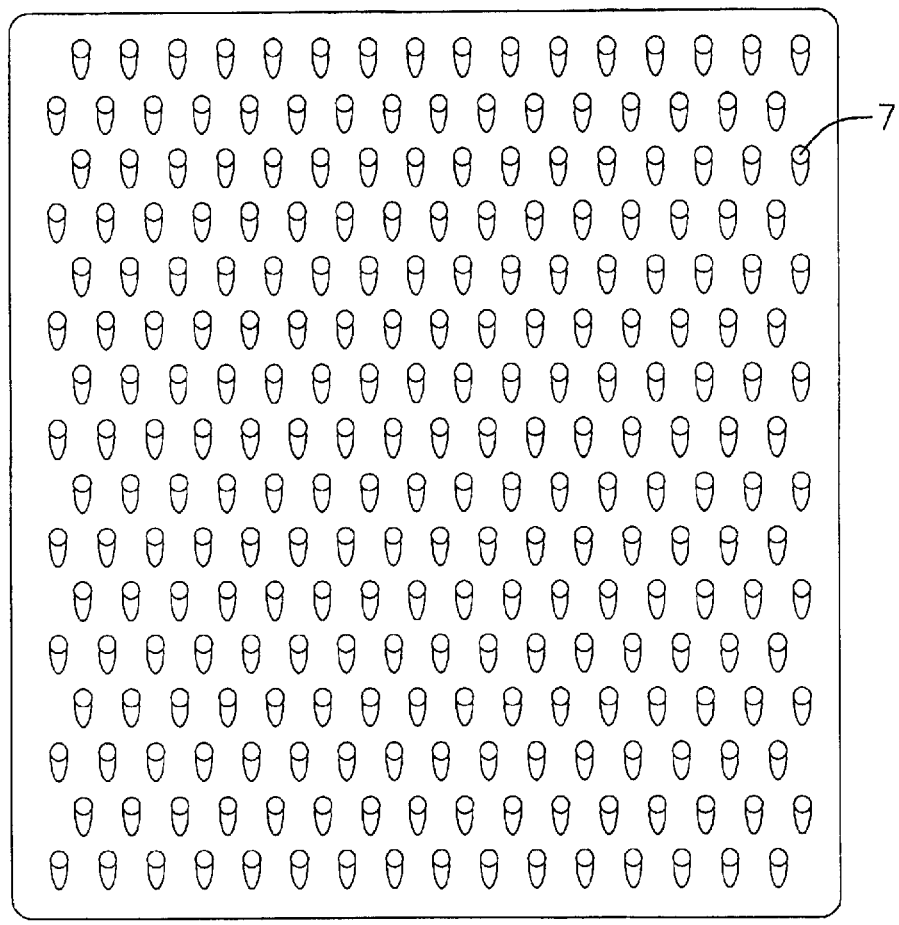
FIGS. 4A, 4B' and 4B" are a front view, partial cross-sectional view and partial enlarged view, respectively of an air guide according to the present invention.
Figure 4B:
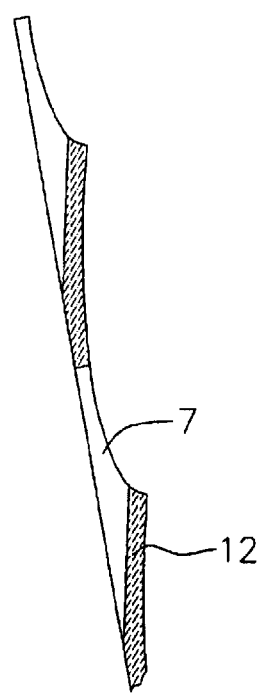
Figure 4B:
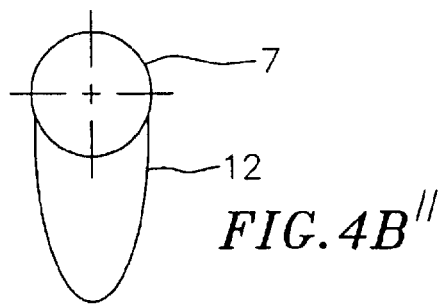
Figure 4B:
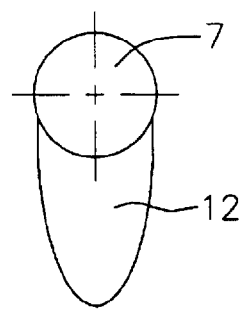

The air guide 5, according to the present invention, may be made from materials such as a metal plate or other suitable materials having depressions 12 having half-cone cross-sectional shapes which define a plurality of holes 7 disposed along their faces. As shown in FIGS. 4A, 4B' and 4B", the depressions 12 are uniformly dispersed along the face of the air guide 5. The half-cone cross-sectional shaped depressions 12 force air flowing through the holes 7 to form columns or columnar flow, and the direction of the holes will define the direction of air flow. When the holes are in the same direction and uniform, the columns formed will be in the same direction and uniform such that air flowing into the air channel 2 will be in the same direction and uniform. The direction of the columns are defined by the direction of the holes and the elevation angle 8 (see FIGS. 1C, 2C and 3C) of the air guide 5 with respect to the support ring 4 of the air filter 1.

Since the air guide 5 may be made of materials rigid relative the materials used to form the air filter, it may strengthen the construction of the air filter 1, as well as function as an air guide.

Figure 5A:
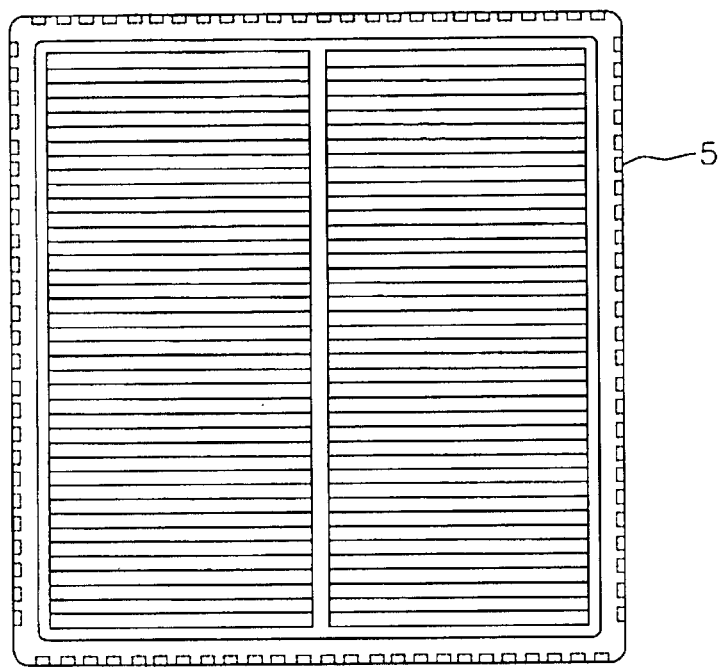
FIGS. 5A, 5B and 5C are top, side and end views, respectively of an air guide that is attached to an air filter having a generally square shape.
Figure 5B:
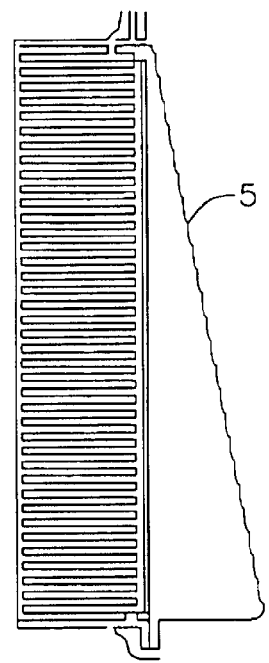
Figure 5C:
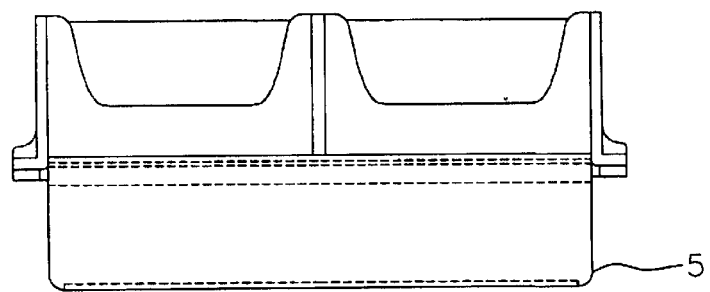

The air guide may can be placed in a variety air filters having different shapes. For example, the air guide 5, as shown in FIGS. 5A, 5B and 5C, may be placed in an air filter 1 having a square-shape and at a certain elevation angle in relation to the face of the air filter. Such installed variations do not decrease the function and advantages of the air guide of the present invention.

What is claimed is:

1. An air guide filter for an internal combustion engine, comprising:

a pleated filter disposed between a pair of support rings; and an air guide disposed between the support rings, the air guide having holes, uniformly disposed about the air guide, each hole bounded by a section having a half-cone cross-sectional shape;

wherein, when the air guide is placed at a certain elevation angle with respect to the support rings, and wherein air flowing through the filter through the air guide is guided and rotated, such that when mixed with fuel a uniform air-fuel mixture is generated.

2. The air guide filter of claim 1 wherein the air guide is placed on an inner part of the pleated filter.

3. The air guide filter of claim 1 wherein the air guide is placed on an outer part of the pleated filter.

4. The air guide filter of claim 1 wherein the plurality of sections are formed in the same direction.

5. The air guide filter of claim 4 wherein the plurality of holes force air flowing through the filter to generate columns of air flow, and wherein the direction of the sections bounding the holes define the air flow direction.

6. The air guide filter of claim 5 wherein the columns formed are in the same direction and are uniform such that all flow into an air channel leading into the combustion chamber of the engine is in the same direction and is uniform.

7. The air guide filter of claim 1 wherein the air guide can be placed in one of a plurality of elevation angles.

8. The air guide filter of claim 1 wherein the air guide is parallel to the pleated filter.

9. The air guide filter of claim 8 wherein the air guide can be placed in one of a plurality of elevation angles.

10. The air guide filter of claim 1 wherein the air guide is made from a material that is more rigid than a material forming the pleated filter.

11. The air guide filter of claim 1 wherein the air guide is made from metal.

12. The air guide filter of claim 1 wherein the air guide is separate from the pleated filter.

13. An air guide filter for an internal combustion engine, comprising:

a filter medium; and an air guide disposed adjacent the filter medium, the air guide having holes uniformly disposed about its face, each hole bounded by a section having a half-cone cross-sectional shape, wherein the holes with sections are oriented at an angle, wherein air flowing through the filter through the air guide is guided and rotated by said holes and sections.

14. The air guide filter of claim wherein the air guide is parallel to the filter medium.

\* \* \* \* \*

UNITED STATES PATENT AND TRADEMARK OFFICE
CERTIFICATE OF CORRECTION

PATENT NO. : 6,802,880 B1  
DATED : October 12, 2004  
INVENTOR(S) : Wijaya

It is certified that error appears in the above-identified patent and that said Letters Patent is hereby corrected as shown below:

Title page,
Item [56], References Cited, FOREIGN PATENT DOCUMENTS,
delete "EP 0 597 173 5/1991", insert -- EP 0 597 173 5/1994 --; and
delete "WO 94/05906 3/1991", insert -- WO 94/05906 3/1994 --
OTHER PUBLICATIONS, insert
-- International Search Report of PCT/IB00/00727 dated February 1, 2001 --

Column 4,
Line 31, delete "claim wherein" insert -- claim 13 wherein --

Signed and Sealed this

Twelfth Day of July, 2005

JON W. DUDAS
*Director of the United States Patent and Trademark Office*